US008169338B2

(12) United States Patent
Mudalige

(10) Patent No.: US 8,169,338 B2
(45) Date of Patent: May 1, 2012

(54) INTER-VEHICLE COMMUNICATION FEATURE AWARENESS AND DIAGNOSIS SYSTEM

(75) Inventor: Upali Priyantha Mudalige, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 560 days.

(21) Appl. No.: 12/179,633

(22) Filed: Jul. 25, 2008

(65) Prior Publication Data

US 2010/0019891 A1 Jan. 28, 2010

(51) Int. Cl.
*G08G 1/00* (2006.01)
*B60Q 1/00* (2006.01)
*G01C 21/00* (2006.01)

(52) U.S. Cl. ......... 340/901; 340/902; 340/438; 701/213

(58) Field of Classification Search .................. 340/901
See application file for complete search history.

(56) References Cited

U.S. PATENT DOCUMENTS 6,185,496 B1 * 2/2001 Matsuno ......................... 701/70
6,404,326 B1 * 6/2002 Timmerman et al. .... 340/286.01
6,445,308 B1 * 9/2002 Koike ........................... 340/902
6,759,942 B2 * 7/2004 Bedi et al. ..................... 340/5.72
6,847,691 B2 * 1/2005 Torikoshi et al. ............. 375/354
6,922,651 B2 * 7/2005 Endoh ........................... 702/122
7,420,954 B2 * 9/2008 Elbatt et al. ................... 370/338
7,688,188 B2 * 3/2010 Kume et al. ................... 340/436
2008/0059036 A1 * 3/2008 Imai et al. ....................... 701/93

* cited by examiner

*Primary Examiner* — Brent Swarthout
*Assistant Examiner* — John Mortell

(57) ABSTRACT

A method is provided for sharing data between a host vehicle and remote entity in an inter-vehicle communication system. Wireless messages are transmitted between the remote entity and the host vehicle. The wireless messages include data relating to sensor information used to enhance environmental awareness of surrounding conditions of the host vehicle. A received wireless message includes sensor information transmitted from the remote entity to the host vehicle. The wireless message further includes an uncertainty indicator relating to the remote vehicle's assessment of an uncertainty of the sensor information transmitted by the remote vehicle. The uncertainty affecting an accuracy of the sensor information is assessed for determining a degree for which the sensor information is to be used in evaluating environmental awareness conditions affecting the host vehicle. Environmental awareness features of the host vehicle are selectively activated in response to assessing the uncertainty affecting the accuracy of sensor information.

20 Claims, 3 Drawing Sheets

INTER-VEHICLE COMMUNICATION FEATURE AWARENESS AND DIAGNOSIS SYSTEM

BACKGROUND OF INVENTION

The present invention relates generally to V2X communications and the uncertainties associated with the information communicated.

V2X vehicle feature functionality relates to vehicle-to-vehicle (V2V) and vehicle-to-infrastructure (V2I) communications which are co-operative systems based on two-way communications for interacting in real time. These systems are preferably directed at traffic management, collision warning, and collision avoidance systems. Such systems can extend a host vehicle's range of awareness of environmental conditions by providing relevant information regarding the status of traffic in addition to any safety related events occurring in proximity to those neighboring vehicles of the host vehicle.

This cooperative communication system increases the quality and reliability of information received by a host vehicle. However, the reliability of the information received from a remote vehicle is still uncertain. That is, inaccuracies may be present in the information received from the remote vehicles due to uncertainties associated with the devices, modules, or subsystem obtaining the sensor information. The more critical the information is as it relates to safety issues, the greater the significance of knowing whether the transmitted information contains any uncertainties as to a remote vehicle's ability to accurately access its vehicle conditions and environmental information.

SUMMARY OF INVENTION

The invention provides a system for indicating an uncertainty associated with sensor information transmitted from a remote entity to a host vehicle so that vehicle environmental awareness features of the host vehicle may be selectively enabled based on the uncertainty of the sensor information transmitted from the remote entity.

An embodiment contemplates a method of sharing data between a host vehicle and remote entity in an inter-vehicular communication system. Wireless messages are transmitted between the remote entity and the host vehicle. The wireless messages include data relating to sensor information that is used to enhance environmental awareness of surrounding conditions of the host vehicle. A received wireless message includes sensor information transmitted from the remote entity to the host vehicle. The wireless message further includes an uncertainty indicator relating to the remote vehicle's assessment of an uncertainty of the sensor information transmitted by the remote vehicle. The uncertainty affecting an accuracy of the sensor information is assessed for determining a degree for which the sensor information is to be used in evaluating environmental awareness conditions affecting the host vehicle. Environmental awareness features of the host vehicle are selectively activated in response to assessing the uncertainty affecting the accuracy of sensor information.

An embodiment contemplates an inter vehicle data sharing system between a remote entity and a host vehicle. The inter vehicle data sharing system includes a remote entity communication system having a transmitter for transmitting a wireless message. The wireless message includes sensor information and an uncertainty indicator relating to the remote vehicle's assessment of an uncertainty of the sensor information. The inter vehicle data sharing system further includes a host vehicle communication system including a receiver for receiving the wireless message that includes the sensor information transmitted from the remote entity to the host vehicle. An on-board computing unit processes the sensor information and uncertainty indicator that is used to enhance environmental awareness of surrounding vehicles of the host vehicle. The processor assesses an uncertainty affecting an accuracy of the sensor information for determining a degree for which the sensor information is to be used in evaluating environmental awareness conditions affecting the host vehicle. The controller selectively activates environmental awareness features of the host vehicle in response to assessing the uncertainty affecting the accuracy of sensor information.

DETAILED DESCRIPTION

Figure 1:
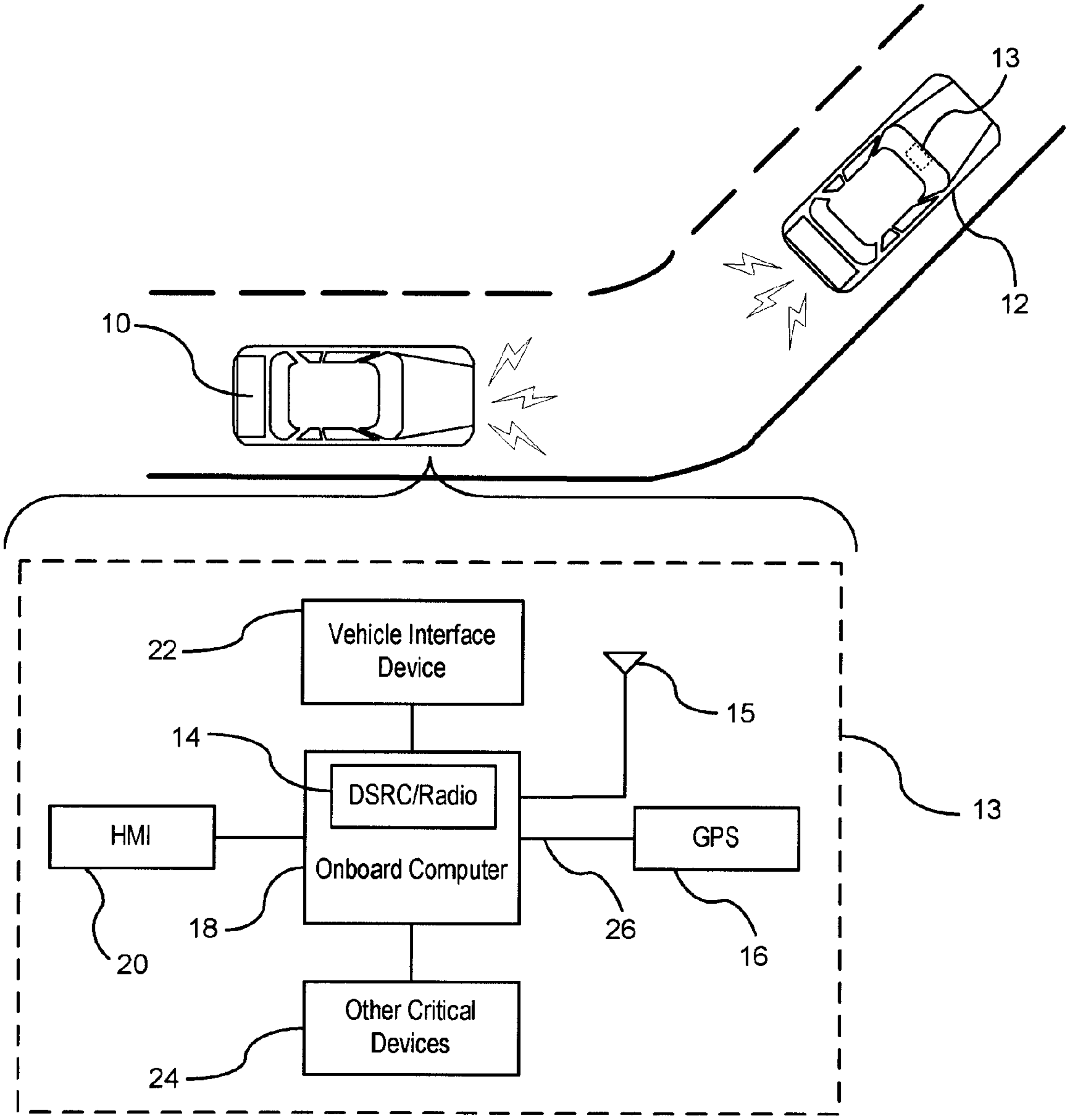
FIG. 1 is a block diagram of an inter vehicle communication system.

There is shown generally in FIG. 1 a host vehicle 10 in communication with a remote entity 12. The remote entity 12 may include another mobile vehicle or a fixed infrastructure for communicating with the host vehicle 10. The remote entity 12 periodically broadcasts its uncertainty information in the form of health status information as part of a general V2X wireless message to the host vehicle 10 over a respective inter-vehicle communication network, such as a dedicated short range communication protocol (DSRC). The health status information relates to the reliability and accuracy of the information obtained by the vehicle devices, software and hardware modules, and other vehicle subsystems.

The V2X wireless message may be transmitted as a standard periodic beacon message. The wireless message includes data about environmental awareness conditions relating to vehicle positions, vehicle kinematics/dynamic parameters, traffic or road events sensed by respective remote vehicles. These environmental awareness conditions are communicated between vehicles to forewarn drivers of vehicles of some type of safety condition, traffic delays, accident, or current condition that could result in an accident. One of the objectives is to provide advance warning to neighboring vehicles of a condition so as to provide additional time to react to the condition. For example, if a vehicle is stopped around a curve in the road, the stopped vehicle may not be readily seen by a driver of a moving vehicle traveling around the curve until the moving vehicle is in a line of sight. At the point where the stopped vehicle becomes visible to the driver of the driven vehicle, taking into consideration the speed of the driven vehicle, may result in less than an optimal distance to react to the stopped vehicle. Vehicles encountering the stopped vehicle in the curvature may provide advanced warnings to other vehicles still not in the line of sight of the stopped vehicle. Such an alert may allow the driver to drive more cautiously or reduce its speed in anticipation of the stopped vehicle. Such warnings for environmental awareness conditions may include, but are not limited to, traffic congestion, accidents, forward collision warnings (FCW), lateral collision warning (LCW), lane departure warning (LDW), slow/stopped vehicles ahead, emergency electronic brake light activation (EEBL), rear end central high mounted stop light (CHMSL), intersection collision warning/avoidance, straight crossing path, working zone warning, blind spot/lane change, and visibility enhancement of pedestrians/cyclists.

The host vehicle 10 and the remote entities 12 (e.g., remote vehicles) are each equipped with a wireless radio 14 that includes a transmitter and a receiver for broadcasting and receiving the wireless messages via an antenna 15. The host vehicle 10 and remote entities 12 further include an on-board computing unit 18 for processing the data contained in the wireless message, a positioning system 16 such as a global positioning system (GPS), a human machine interface (HMI) 20 such as a driver vehicle interface module, a vehicle interface device 22 for collecting information such as speed, braking, yaw rate, acceleration, etc. The host vehicle 10 and remote entities 12 may also include other critical devices 24 which monitor critical events, health status of hardware and software modules. The above mentioned devices, modules, and subsystems are connected through a wired communication bus 26, such as a CAN, for communicating with one another. It is understood that the remote entity 12 as shown in FIG. 1 includes the same communication architecture of the host vehicle 10 as described above and is illustrated generally by 13.

The GPS 16 utilizes a constellation of satellites that transmit signals which enable a GPS receiver of a vehicle to determine its location, speed, direction, and time. GPS data for a respective vehicle of the inter-vehicle communication network is broadcast as part of the wireless message for identifying the location of the transmitting vehicle. This allows the respective on-board computing unit 18 of the host vehicle 10 to evaluate the message contents in light of the remote vehicle's position for assessing the relevance of a respective condition to the host vehicle 10.

High performance GPS systems can locate a vehicle within a meter or less and can perform far better than low-performance GPS systems. The accuracy of the GPS system factors greatly into how the host vehicle 10 utilizes the information contained therein as positioning errors may result in inaccurate data being broadcast to the host vehicle 10.

Positioning errors such as standard deviation of latitude, longitude, altitude, heading, and velocity are predicted by the GPS receiver and may be determined according to whether the GPS receiver is in a high accuracy mode (e.g., RTK), medium accuracy mode (e.g., WMS/DGPS), or low accuracy module (e.g., uncorrected GPS).

As indicated earlier, the accuracy of the GPS affects how the wireless information received by the host vehicle 10 is utilized. For example, if the accuracy of the GPS of a remote vehicle is accurate only to a range of 3 meters, then for a FCW related information by the remote vehicle traveling in the same lane of the host vehicle 10, it is uncertain whether a respective stopped vehicle is in the lane of the host vehicle 10 or an adjacent lane due to a potential inaccuracy of the GPS of the remote vehicle. Therefore, as a result of the uncertainty, the host vehicle 10 may adjust its environmental awareness features in response to the uncertainty of the GPS. The host vehicle 10 may issue a stopped vehicle ahead warning as opposed to a FCW since it is undetermined as to which lane the stopped vehicle is located. Alternatively, if the accuracy of the remote vehicle GPS is within a half a meter, then the host vehicle 10 can issue a FCW to alert the driver that the stopped vehicle is in the host vehicle's lane based on the accuracy of the GPS (shown in FIG. 2).

Various other factors which affect how the message information is utilized include errors in the communication system. The communication bus 26 couples all wired communications within the host vehicle 10 and the remote vehicles. Therefore, any faults that occur in the communication between the devices, modules, and subsystems impacts a respective vehicles ability to retrieve and transmit accurate health status information. Examples of communication bus errors may include, but are not limited to, an error between the on-board computing unit 18 and the HMI 20, the vehicle interface device 22 and the on-board computing unit 18, and the GPS 16 and the on-board computing unit 18.

Figure 2:
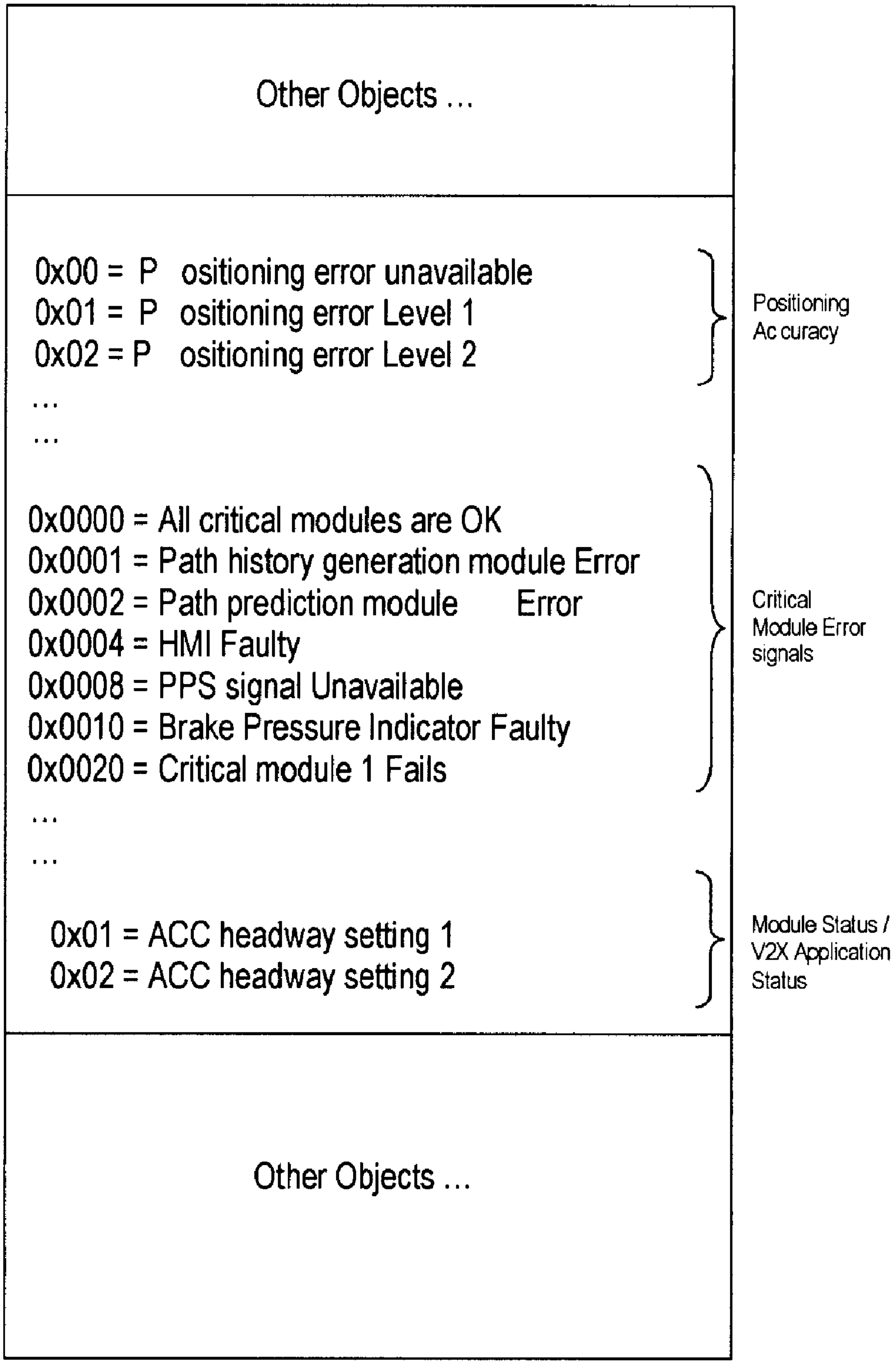
FIG. 2 is a wireless message containing a health status uncertainty flag.

As discussed earlier, the health status information relates to the reliability and accuracy of the information obtained by the devices, modules, and subsystems. The health status information of a respective remote vehicle is determined by combining each of the individual health status of the remote vehicles critical devices, modules and subsystems. Each respective remote vehicle, including the host vehicle 10, monitors and maintains their own real-time health status of its critical devices, modules and subsystems. A vehicle communication manager module aggregates the respective health status information of each device, module, and subsystem into a compact health status uncertainty flag. The uncertainty flag includes at least one uncertainty indicator relating to the remote vehicle's assessment of the uncertainty associated with information obtained by sensors for each device, module, or subsystem. An example of a compact health status uncertainty flag is shown in FIG. 2. The wireless message broadcast to neighboring vehicles contains the compact health status uncertainty flag as part of the standard V2X wireless message information.

When the host vehicle 10 receives the wireless message that contains, but is not limited to, the message information and the uncertainty flag, the on-board computing unit 18 uses the uncertainty flag to assess the degree of uncertainty affecting the accuracy of the information contained in the wireless message. The host vehicle 10 selectively activates environmental awareness features in response to the uncertainty flag. Selectively activating environment awareness features refers to enabling, disabling, or adjusting the environmental awareness features of the host vehicle 10.

Disabling/enabling feature functionality results in deactivating/activating a feature or feature functionality of a respective device, module, or subsystem. For example, a respective condition for disabling feature functionality may occur when a respective uncertainty flag indicates the remote vehicle's brake system is faulty. The host vehicle will disable any EEBL feature alerts in response to the faulty condition as indicated by the respective uncertainty indicator. In another example, disabling feature functionality may occur when the remote entities HMI is faulty. Upon receiving the uncertainty flag indicating the feature functionality is faulty, the host vehicle disables the social chat feature. In yet another example for disabling/enabling feature functionality occurs when the uncertainty flag indicates that the Pulse Per Second (PPS) signal is unavailable. The PPS signal from the vehicle onboard GPS receiver is an essential timing signal used to synchronize clocks of the wireless (DSRC) radios between respective communicating vehicles and also between the respective vehicles and the infrastructure. A typical DSRC protocol has seven 10 MHz channels. The DSRC includes one control channel and the remaining channels are called service channels. For channel switching to occur, the data provider (i.e., the radio transmitting the message) transmits a control message called Wave Service Announcement (WSA) over the control channel to all receiving devices. The control message indicates which channel the data message is being transmitted on. The receiving radios receive this message on their respective control channel. If the receiving vehicle is interested in the incoming data, that respective vehicle may switch to the appropriate service channel as indicated in the control message for receiving the data at a designated time indicated in the control message. To receive the data message, the receiving radio must switch the channel at the precise time interval. Therefore, each of the wireless (DSRC) radios must have a synchronized global time signal. The time signal is designated as the PPS and it emanates from the vehicle's respective onboard GPS receiver. If the PPS signal is not present, then DSRC radios cannot switch channels since they do not have a common (global) time reference. As a result, since synchronization is not feasible, by default the message is communicated only by way of the control channel.

In addition to enabling or disabling feature functionality, feature functionality may be adjusted. Adjusting feature functionality results in adjusting or limiting the functionality of a respective device, module or subsystem based on the uncertainty flag. An example of a respective condition for limiting the feature functionality of the host vehicle occurs when the remote entity exhibits poor GPS accuracy. Any feature functionality of the host vehicle that uses GPS data is disabled and only road level V2X feature functionalities are enabled. Another example for limiting feature functionality occurs when a respective uncertainty flag indicates a remote vehicle's path history generation module is malfunctioning. The host vehicle temporarily disables the dependency on the remote vehicle generated path history, and as an alternative, constructs the remote vehicle path history onboard using valid remote vehicle data such as GPS, yaw rates, and map data to support limited feature functionality. In yet another example of adjusting features of the host vehicle includes adjusting a sensitivity of a host rear end CHMSL feature based on current remote vehicle ACC setting. The above examples are only a few of the various conditions that may occur for selectively activating environmental awareness features and are not meant to be exclusive of the various conditions that may occur.

Figure 3:
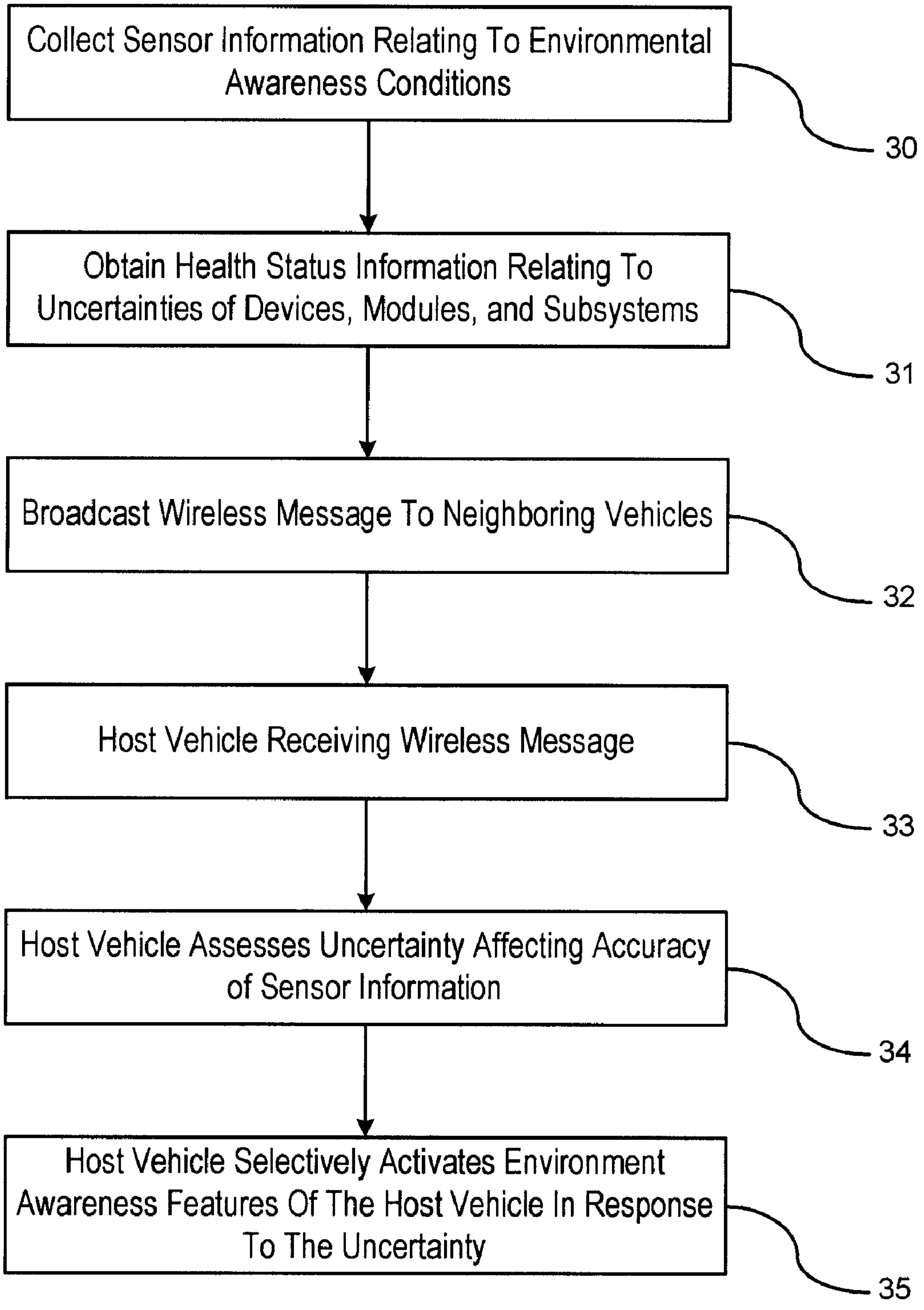
FIG. 3 is a flowchart of a method for data sharing environmental awareness information among vehicles.

FIG. 3 illustrates a flowchart of a method for selectively activating the environmental awareness features of a host vehicle. In step 30, a remote vehicle collects sensor information relating to environment awareness conditions. In step 31, the remote vehicle monitors and maintains a real-time health status of the accuracy and status of its critical sensors, devices, modules and subsystems. The vehicle communication manager module aggregates the respective status information into a compact health status uncertainty flag (e.g., uncertainty indicators).

In step 32, the remote vehicle broadcasts the wireless message to neighboring vehicles. The wireless message includes the sensor information and the uncertainty flag. The uncertainty flag contains information relating to the remote vehicle's assessment of an uncertainty associated with information obtained by each of the sensors for each device, module, or subsystem.

In step 33, the wireless message is received by the host vehicle. In step 34, the host vehicle assesses the uncertainty affecting the accuracy of the sensor information as contained in the uncertainty flag. In assessing the uncertainties, the host vehicle determines a degree for which the sensor information is to be used in evaluating environmental awareness conditions.

In step 35, the host vehicle selectively activates environment awareness features of the host vehicle based on the uncertainty flag. For those respective critical modules and subsystems which have been identified in the wireless message as having an associated uncertainty, and for which the host vehicle has determined that the uncertainty is of a degree that will affect the use of the sensor information in the host vehicle, the host vehicle disables, enables, or adjusts the environment awareness features of the host vehicle of the host vehicle.

While certain embodiments of the present invention have been described in detail, those familiar with the art to which this invention relates will recognize various alternative designs and embodiments for practicing the invention as defined by the following claims.

What is claimed is:

1. A method of sharing data between a host vehicle and a remote entity in an inter-vehicle communication system, wherein wireless messages are transmitted between the remote entity and the host vehicle, the wireless messages transmitted by the remote entity including data relating to sensor information collected by the remote entity that is used by the host vehicle to enhance environmental awareness of surrounding conditions of the host vehicle, the method comprising the steps of:

receiving a wireless message that includes the sensor information transmitted from the remote entity to the host vehicle, the wireless message further including an uncertainty flag relating to the remote entity's assessment of an uncertainty of the sensor information transmitted by the remote entity;

assessing the uncertainty affecting an accuracy of the sensor information for determining a degree for which the sensor information is to be used in evaluating environmental awareness conditions affecting the host vehicle; and selectively modifying environmental awareness features of the host vehicle in response to assessing the uncertainty affecting the accuracy of sensor information.

2. The method of claim 1 wherein the remote entity is a remote vehicle.

3. The method of claim 1 remote entity is a remote communication infrastructure.

4. The method of claim 1 wherein the wireless message includes real time status information from the remote entity.

5. The method of claim 1 wherein the sensor information includes global positioning status information from the remote entity.

6. The method of claim 1 wherein the sensor information includes sensed data relating to environmental awareness conditions.

7. The method of claim 1 wherein the sensor information includes an assessment of collision threats.

8. The method of claim 1 wherein selectively modifying environmental awareness features includes selectively enabling respective features of the host vehicle that can operate at the respective level of accuracy as assessed.

9. The method of claim 1 wherein selectively modifying environmental awareness features includes disabling respective features of the host vehicle in response to the respective level of accuracy as assessed.

10. The method of claim 1 wherein selectively modifying environmental awareness features includes selectively adjusting respective features of the host vehicle for operation that conforms with the respective level of accuracy as assessed.

11. The method of claim 1 wherein the uncertainty flag includes at least one uncertainty indicator, wherein each respective uncertainty indicator relates to the uncertainty of a respective portion of sensor information contained in the wireless message.

12. The method of claim 11 wherein the uncertainty indicator relates to positioning errors in the global positioning system of the remote entity.

13. The method of claim 12 wherein the uncertainty indicator relates to faults in a respective module of the remote entity.

14. The method of claim 12 wherein the uncertainty indicator relates to faults in a communication bus of the remote entity.

15. The method of claim 12 wherein the uncertainty indicator relates to faults in a PPS time synchronization signal.

16. The method of claim 1 wherein the wireless message is the transmitted as a standard periodic beacon message.

17. An inter-vehicle data sharing system between a remote entity and a host vehicle, the system comprising:

a remote entity transmitter for transmitting a wireless message, the wireless message including sensor information and an uncertainty indicator relating to the remote entity's assessment of an uncertainty of the sensor information;

a host vehicle receiver for receiving the wireless message that includes the sensor information transmitted from the remote entity to the host vehicle;

an on-board computing unit for processing the sensor information and uncertainty indicator that is used to enhance environmental awareness of surrounding vehicles of the host vehicle, the processor assessing an uncertainty affecting an accuracy of the sensor information for determining a degree for which the sensor information is to be used in evaluating environmental awareness conditions affecting the host vehicle; and wherein the controller selectively modifies environmental awareness features of the host vehicle in response to assessing the uncertainty affecting the accuracy of sensor information.

18. The system of claim 17 further comprising a global positioning system for determining a positioning of the host vehicle.

19. The system of claim 17 further comprising a human machine interface unit for communicating the selective modification of environment awareness features of the host vehicle to a driver.

20. The system of claim 19 further comprising a dedicated short range communication protocol and a PPS time synchronization signal used to facilitate the communication of the wireless message between the remote transmitter and the host receiver.

* * * * *